R. L. TAFT.
TIRE BUILDING APPARATUS.
APPLICATION FILED MAY 25, 1915.
1,209,779.
Patented Dec. 26, 1916.
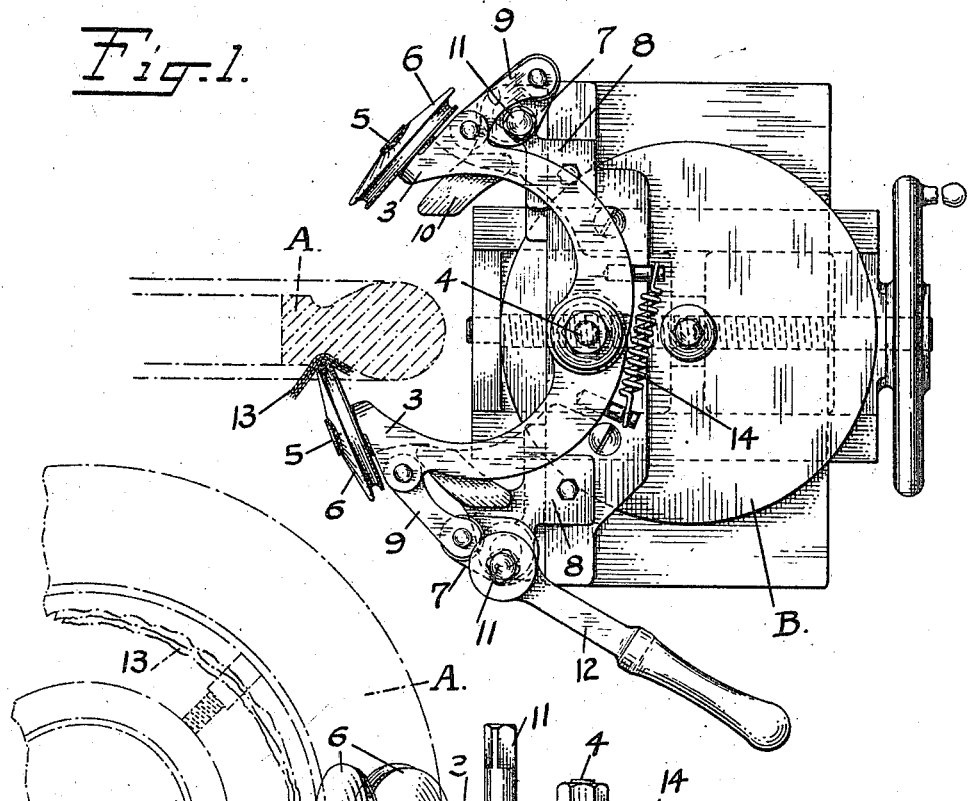
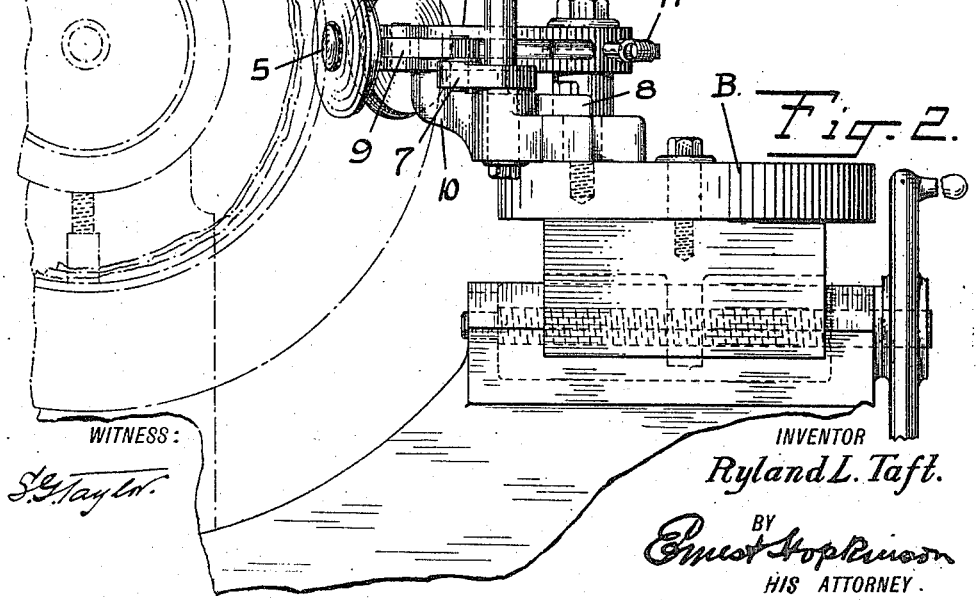
WITNESS:
S. G. Taylor.
INVENTOR
Ryland L. Taft.
BY
Ernest Hopkinson
HIS ATTORNEY.

UNITED STATES PATENT OFFICE.

RYLAND L. TAFT, OF HARTFORD, CONNECTICUT, ASSIGNOR TO THE HARTFORD RUBBER WORKS COMPANY, A CORPORATION OF CONNECTICUT.

TIRE-BUILDING APPARATUS.

1,209,779.     Specification of Letters Patent.     Patented Dec. 26, 1916.

Application filed May 25, 1915. Serial No. 30,257.

*To all whom it may concern:*

Be it known that I, RYLAND L. TAFT, a citizen of the United States, and a resident of Hartford, in the county of Hartford and State of Connecticut, have invented certain new and useful Improvements in Tire-Building Apparatus, of which the following is a full, clear, and exact description.

This invention relates to tire building apparatus and has for an object to provide in combination with such apparatus means for quickly and uniformly setting bead wires and bead cores in place during the process of building a tire carcass.

In the manufacture of pneumatic tire casings the carcass portion is built up on cores in so-called tire building machines. These machines comprise a chuck for receiving a tire core, and a "turret" for supporting the various devices which are used in the different operations of building the tire carcass. When the necessary number of fabric plies have been rolled into place by so-called "stitchers" the "bead wires" are placed in position over them, and rolled into close contact with the fabric. In case the tire is of the so-called "quick detachable" or "clencher" types bead cores of stiff rubber are similarly set in place in the edges of the carcass.

It is essential that the bead wires, which consist of several loops of wire taped together to form a hoop, or the bead cores be accurately placed and firmly united with the fabric carcass. By this invention I provide a device which rolls the above mentioned elements into place with great accuracy, and transmits great pressure thereagainst with comparatively small applied force.

For a clearer understand of my invention, reference is made to the following description and the accompanying drawings wherein;

Figure 1 is a plan view of my device, and Fig. 2 is a side elevation of the same.

In the drawings A designates a tire core mounted on the chuck of a tire building machine.

B designates the turret of the tire building machine.

To avoid confusion I shall confine myself to a description of my device as used for setting bead wires in place in a carcass, it being understood that it is equally applicable for positioning the stiff rubber bead cores in "clenched" and "quick detachable" tires.

The setter, which forms the subject matter of this application, is mounted on the turret B, and consists of the following parts: Two arms 3, 3 are pivoted on a stud 4 which is firmly attached to the turret B. At the free or outer end of each of the arms 3, 3 is provided a stud 5 on which a grooved disk 6 is revolubly mounted. Outside of each of the arms 3, 3 is a fulcrum stud 11 having an arm 7 revolubly mounted in a bracket 8 which is firmly attached to the turret B. This arm 7 is connected with the arm 3 by a link 9, the latter forming with the arm 7 a toggle for forcing the arm 3 inwardly against the core A.

Under each of the arms 3 is provided an arm or bracket 10 which serves as support against downward displacement of the arm 3 when contacting with the core A. The arms 3 are normally held swung away from the core by a suitable spring 14. The stud 11 is squared and a lever or wrench 12 is provided with a square opening to engage same.

The operation of my device is as follows, viz: When the desired number of fabric plies 13 have been built up on the core A, the taped bead wire is laid in position about the ledge which is formed on the core to determine the edges of the tire being built thereon. The turret of the machine is adjusted so that the stud 4 lies in a vertical plane through the center of the core, and so the disk 6 will swing into the groove of the core A. The core is then started to rotate, the wrench 12 is applied to the squared stud 11, and the arm 3 forced inward to carry the disk 6 against the bead wire. As the disk is swung into the groove of the core A, a flange on the disk lifts the bead wire slightly away from the ledge of the core and throws it into the groove, at the same time forcing it firmly against the frictioned fabric, in place thereon. The toggle formed by the arm 7 and the link 9 is adapted to exert its greatest leverage when the disk 6 is in contact with the core, so that a relatively small force applied to the handle of the wrench 12 produces a very great pressure against the bead wire whereby the frictioned tape with which it is wound is caused to closely adhere to the frictioned fabric on the core.

By means of this device it is possible to set the bead wires in place on a carcass much more quickly and accurately than is possible by the use of the hand tools heretofore utilized for the purpose. It is possible also to produce a much firmer adhesion between the taped wire and the frictioned fabric since the pressure applied thereto is much greater than is possible by the use of the hand tool.

When the device is used for setting the hard rubber cores in the edges of "clencher" and "quick detachable" tires, the operation is the same, but differently shaped rollers are substituted for the disks 6.

Having thus described my invention, what I claim and desire to protect by Letters Patent is:

1. In a tire building machine having a support, means mounted on said support for setting a bead wire in position in a tire carcass, a lever fulcrumed on said support and adapted to swing through an arc of substantially 180° a link connecting said means and said lever, a spring for normally holding said setting means in inoperative position, in which position said link and lever are substantially parallel, whereby said setting means is positively maintained at the limit of its outward motion by said spring.

2. In a tire building machine having a support, means mounted on said support for setting a bead core in position in a tire carcass, a bracket mounted on said support for supporting said means against downward displacement, a lever fulcrumed on said support, a toggle connection between said means and said lever, and means for normally maintaining said setting means in inoperative position.

3. In combination with a tire building machine having a turret, an arm pivotally mounted on said turret, a disk revolubly mounted on the free end of said arm, a lever fulcrumed on said turret, means for turning said lever, a toggle connection between said lever and said arm whereby a relative turn of said lever will act to force said arm against a tire core, and means on said turret for supporting said arm against downward displacement.

4. In combination with a tire building machine having a turret, an arm pivotally mounted on said turret, a disk revolubly mounted on the free end of said arm, a lever fulcrumed on said turret, means for turning said lever, a toggle connection between said lever and said arm whereby a relative turn of said lever will act to force said arm against a tire core, and means for normally maintaining said arm in inoperative position.

5. In combination with a tire building machine having a turret, an arm pivotally mounted on said turret, a disk revolubly mounted on the free end of said arm, a lever fulcrumed on said turret, means for turning said lever, a toggle connection between said lever and said arm whereby a relative turn of said lever will act to force said arm against a tire core, means on said turret for supporting said arm against downward displacement, and means for normally maintaining said arm in inoperative position.

Signed at Hartford, Conn., this 20th day of May, 1915.

RYLAND L. TAFT.

Witnesses:
E. W. FOTHERGILL,
SAM T. WHELAN.